(12) United States Patent
Nomura et al.

(10) Patent No.: US 6,445,517 B1
(45) Date of Patent: Sep. 3, 2002

(54) ZOOM LENS BARREL

(75) Inventors: Hiroshi Nomura, Saitama; Kazuyoshi Azegami, Tokyo, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/708,555

(22) Filed: Nov. 9, 2000

(30) Foreign Application Priority Data

Nov. 15, 1999 (JP) .......................................... 11-323858

(51) Int. Cl.⁷ ............................ G02B 15/14; G02B 7/04
(52) U.S. Cl. ..................... 359/823; 359/826; 359/700
(58) Field of Search ................................. 359/822, 823, 359/826, 699, 696, 700, 701, 703, 704; 396/75, 85, 348, 349

(56) References Cited

U.S. PATENT DOCUMENTS

| | | | |
|---|---|---|---|
| 4,487,482 A | 12/1984 | Itoh et al. | 359/699 |
| 4,707,083 A * | 11/1987 | Iizuka et al. | 359/700 |
| 5,488,513 A | 1/1996 | Tanaka | 359/699 |
| 6,198,578 B1 * | 3/2001 | Iwasa et al. | 359/699 |

* cited by examiner

*Primary Examiner*—Georgia Epps
*Assistant Examiner*—Saeed Seyrafi
(74) *Attorney, Agent, or Firm*—Greenblum & Bernstein, P.L.C.

(57) ABSTRACT

A zoom lens barrel includes a through groove which is provided on a first cylindrical member; a radial projection provided on a second cylindrical member; and a roller which is supported by the radial projection and is fitted in the through groove. The through groove has an opening width on the inner diameter of the first cylindrical member which is greater than the opening width on the outer diameter thereof. The roller is provided with an slip-off prevention portion whose diameter is greater than the opening width of the through groove on the outer diameter of the first cylindrical member, but smaller than the opening width on the inner diameter. The through groove is provided with a large width portion at which the roller is fitted into, so that the slip-off prevention portion is located in the through groove.

11 Claims, 4 Drawing Sheets

ZOOM LENS BARREL

BACKGROUND OF THE INVENTION

1. Field of the Invention

The present invention relates to a zoom lens barrel.

2. Description of the Related Art

In a known zoom lens camera, a zoom lens barrel has a cam mechanism including a cam ring which is rotatably fitted in a lens barrel block, and a cam follower which is engaged in a cam groove formed in the cam ring, to move a lens group in the optical axis direction in accordance with photographing modes.

For example, in an arrangement in which the cam follower is provided with a pin (radial projection) secured to a lens holder of the lens group and a roller supported by the pin, and the cam groove extends through the thickness of the cam ring, and the roller is not secured; hence there is a chance that the roller may move in the cam groove and be detached from the pin during assembly or during use of the camera.

SUMMARY OF THE INVENTION

It is an object of the present invention to provide a zoom lens barrel using a cam mechanism, in which a cam follower is provided with a pin and a roller supported by the pin, wherein no accidental detachment of the roller from the pin takes place.

To achieve the object mentioned above, according to the present invention, a zoom lens barrel is provided, including a through groove which is provided on a first cylindrical member; a radial projection provided on a second cylindrical member which is disposed in the first cylindrical member; and a roller which is supported by the radial projection and is fitted in the through groove. The through groove formed on the first cylindrical member has an opening width on the inner diameter side of the first cylindrical member which is greater than the opening width on the outer diameter side thereof. The roller is provided with an slip-off prevention portion whose diameter is greater than the opening width of the through groove on the outer diameter side but smaller than the opening width on the inner diameter side. The through groove is provided with a large width portion at which the roller is fitted in the through groove from the outside of the first cylindrical member so that the slip-off prevention portion is located in the through groove.

In an embodiment, the through groove is in the form of a non-rectangular sectional shape having a tapered side, wherein the width is gradually increased from the outer diameter side of the first cylindrical member toward the inner diameter side thereof; and the slip-off prevention portion is in the form of a non-rectangular sectional shape having a tapered side, wherein the diameter of the slip-off prevention portion is gradually increased from the outer diameter side of the first cylindrical member toward the inner diameter side thereof, wherein the non-rectangular sectional shape corresponds to the sectional shape of the through groove.

Preferably, a third cylindrical member provided outside the first and second cylindrical members is included, the third cylindrical member being provided with a bottomed groove on the inner peripheral surface thereof whose profile is different from the profile of the through groove of the first cylindrical member. The roller is provided with an engagement portion which has a diameter smaller than the width of the through groove on the outer diameter side of the first cylindrical member and which projects from the through groove and through the outer diameter side to engage with the bottomed groove.

Preferably, the first cylindrical member is a linear movement cylinder which is guided to move in the optical axis direction; the third cylindrical member is a rotary cylinder which is connected to the linear movement cylinder so as to rotate relative thereto but not to relatively move in the optical axis direction; the bottomed groove of the third cylindrical member extends in parallel with the optical axis and the through groove is inclined with respect to the optical axis; and the second cylindrical member is a rotary feed cylinder which is moved in the optical axis direction while rotating in accordance with the profile of the through groove via the rotation of the rotary cylinder.

Upon assembling the roller into the bottomed groove of the third cylindrical member, the roller which is inserted in the through groove of the first cylindrical member through the large width portion is moved to a portion other than the large width portion, so that the roller is engaged in the bottomed groove of the third cylindrical member.

According to another aspect of the present invention, a guiding mechanism for cylindrical members is provided, including a first cylindrical member and a second cylindrical member which is disposed in the first cylindrical member; a through groove formed on the first cylindrical member, the through groove having an opening width on the inner diameter side of the first cylindrical member which is greater than the opening width on the outer diameter side thereof; and a roller which is fitted in the through groove and is supported on a radial projection provided on the second cylindrical member, the roller being provided with an slip-off prevention portion whose diameter is greater than the opening width of the through groove on the outer diameter side of the first cylindrical member and smaller than the opening width on the inner diameter side thereof.

Preferably, the through groove is provided with a partial large width portion at which the roller is fitted in the through groove from the outside of the first cylindrical member so that the slip-off prevention portion is located in the through groove.

In an embodiment, the through groove is in the form of a non-rectangular sectional shape having a tapered side, wherein the width is gradually increased from the outer diameter side of the first cylindrical member toward the inner diameter side thereof; and the slip-off prevention portion is in the form of a non-rectangular sectional shape having a tapered side, wherein the diameter of the slip-off prevention portion is gradually increased from the outer diameter side of the first cylindrical member toward the inner diameter side thereof, wherein the non-rectangular sectional shape corresponds to the sectional shape of the through groove.

Preferably, a third cylindrical member provided outside the first and second cylindrical members is included, the third cylindrical member being provided with a bottomed groove on the inner peripheral surface thereof whose profile is different from the profile of the through groove of the first cylindrical member. The roller is provided with an engagement portion which has a diameter smaller than the width of the through groove on the outer diameter side of the first cylindrical member and which projects from the through groove and through the outer diameter side to engage with the bottomed groove.

Preferably, the first cylindrical member is a linear movement cylinder which is guided to move in the optical axis direction; the third cylindrical member is a rotary cylinder which is connected to the linear movement cylinder so as to rotate relative thereto but not to relatively move in the optical axis direction; the bottomed groove of the third cylindrical member extends in parallel with the optical axis and the through groove is inclined with respect to the optical axis; and the second cylindrical member is a rotary feed cylinder which is moved in the optical axis direction while rotating in accordance with the profile of the through groove via the rotation of the rotary cylinder.

Upon assembling the roller into the bottomed groove of the third cylindrical member, the roller which is inserted in the through groove of the first cylindrical member through the large width portion is moved to a portion other than the large width portion, so that the roller is engaged in the bottomed groove of the third cylindrical member.

The present disclosure relates to subject matter contained in Japanese Patent Application No. 11-323858 (filed on Nov. 15, 1999) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENT

Figure 1:
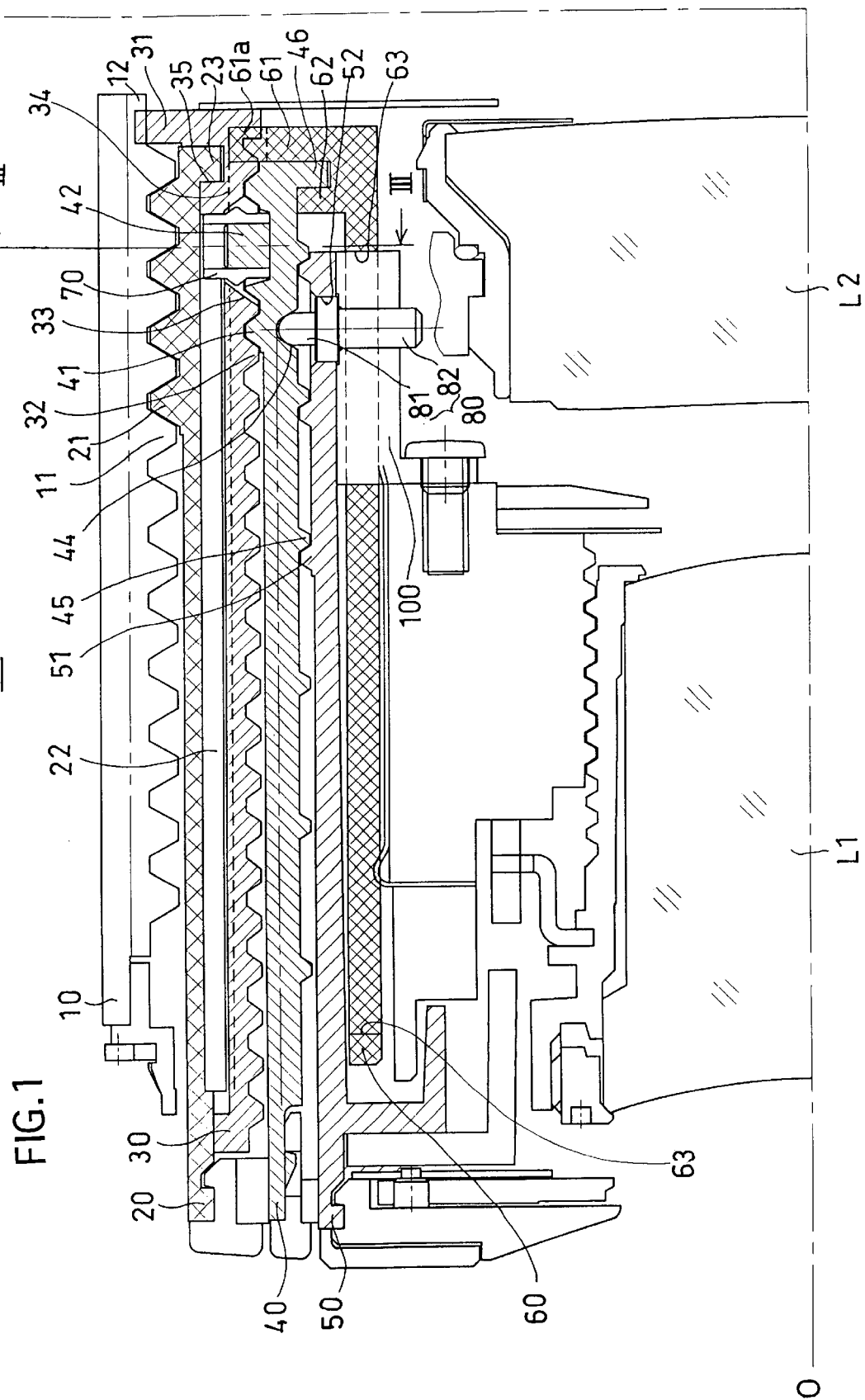
FIG. 1 is a sectional view of an upper half of a zoom lens barrel according to the present invention.

As shown in FIG. 1, a zoom lens barrel 110 according to the present invention, is provided with two lens groups including a first lens group (front lens group) L1 and a second lens group (rear lens group) L2. The zooming operation is carried out by moving the first and second lens groups along predetermined tracks, and the focusing operation is carried out by moving the first lens group L1. Note that a drive mechanism which drives the second lens group L2 is not shown in the drawings because the drive mechanism does not directly relate to the object of the present invention.

A stationary ring 10 is secured to a camera body by a known securing device. The stationary ring 10 is provided on its inner peripheral surface with a female helicoid 11 and a linear movement guide groove 12 which intersects the female helicoid 11 and extends in parallel with the optical axis O.

A male helicoid ring (third cylindrical member) 20 is provided in the stationary ring 10. The male helicoid ring 20 is provided, on the outer peripheral surface of the rear end thereof, with a male helicoid 21 which engages with the female helicoid 11. The male helicoid ring 20 is provided on its inner peripheral surface with an engagement groove (bottomed groove) 22 which extends in parallel with the optical axis O. The male helicoid ring 20 is provided on its rear end with an inner flange 23 which protrudes radially and inwardly.

Figure 3:
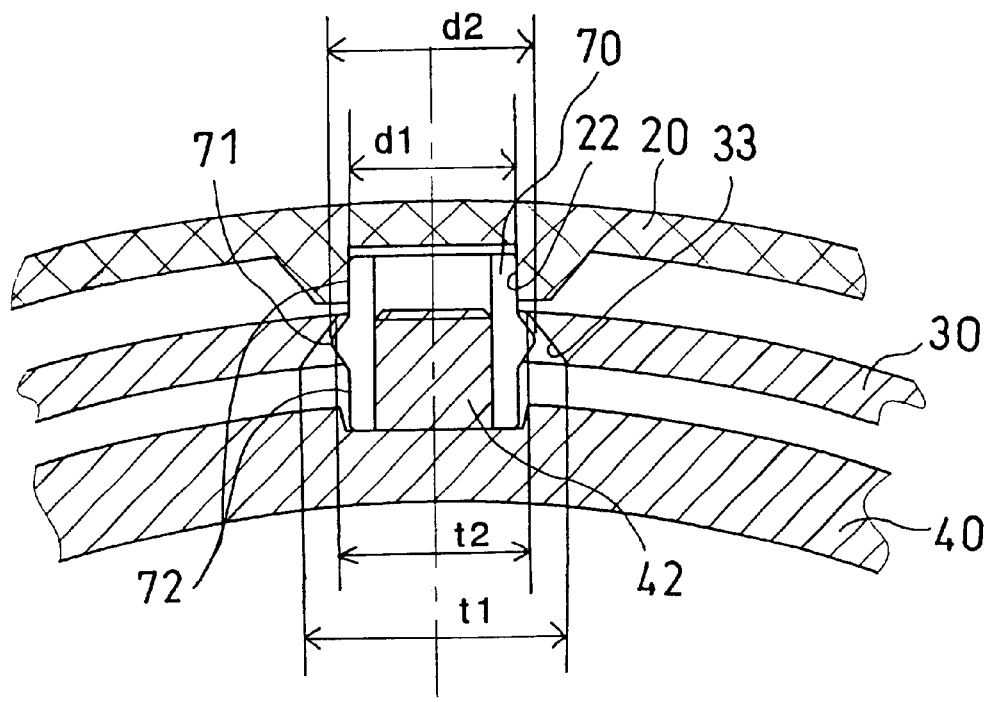
FIG. 3 is an enlarged sectional view of a zoom lens barrel taken along the line III—III in FIG. 1, according to the present invention.

A linear movement ring (first cylindrical member) 30 is arranged in the male helicoid ring 20. The linear movement ring 30 is provided on its rear end with an annular engagement groove 35 in which the inner flange 23 of the male helicoid ring 20 is engaged, so that the linear movement ring 30 is rotatable relative to the male helicoid ring 20 and is movable in the optical axis direction together with the male helicoid ring 20. The linear movement ring 30 is provided on its rear end with a radially and outwardly extending projection 31 which is slidably fitted in the linear movement guide groove 12 of the stationary ring 10. Consequently, the linear movement ring 30 is guided so as to linearly move in the optical axis direction and so as not to rotate relative to the stationary ring 10. The linear movement ring 30 is also provided on its inner peripheral surface with a female helicoid 32 and a helical through groove 33 extending in parallel with the female helicoid 32. As shown in FIG. 3, the helical through groove 33 has a non-rectangular sectional shape of which the open end of the groove on the inner diameter side has a width t1 which is greater than the open end width t2 on the outer diameter side thereof (t2<t1), i.e., a substantially trapezoidal sectional shape whose major side corresponds to the inner diameter side. The helical through groove 33 extends through the wall of the linear movement ring 30.

Figure 4:
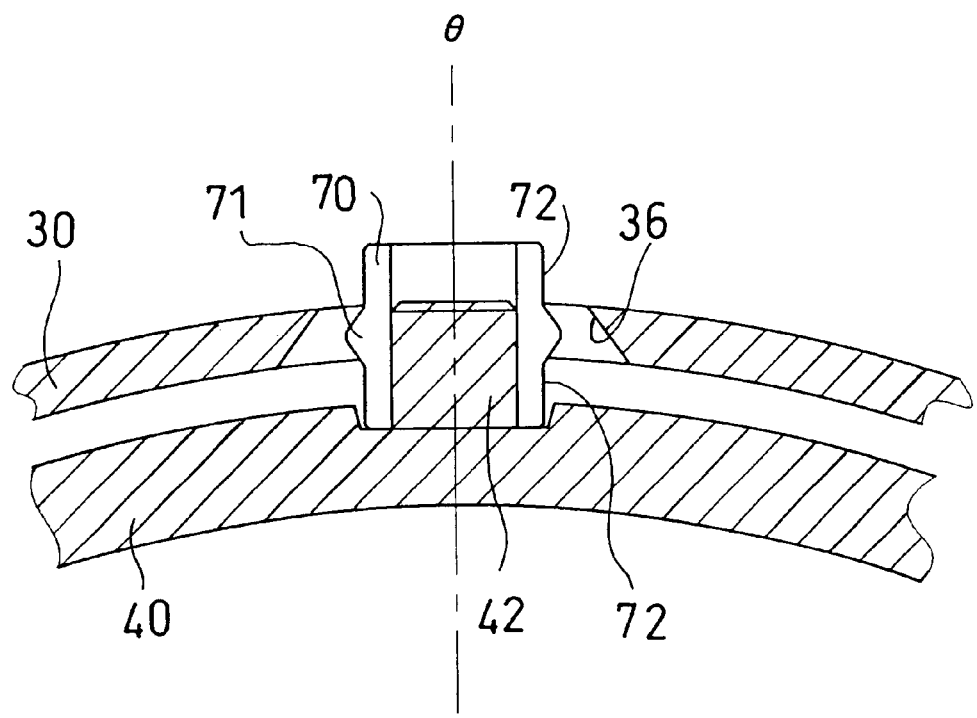
FIG. 4 is an enlarged sectional view of a portion of the helical through groove whose angle is θ (FIG. 2) and surroundings thereof, taken along the line III—III in FIG. 1.

The helical through groove 33 is provided with a large width portion 36 at a position of angle θ, as shown in FIG. 4. Also, a linear movement guide groove 34 which intersects the helical through groove 33 and the female helicoid 32 and which extends in parallel with the optical axis O is formed on the inner peripheral surface of the linear movement ring 30.

A cam ring (second cylindrical member) 40 is arranged in the linear movement ring 30. The cam ring 40 is provided, on the outer peripheral surface at the rear end thereof, with a male helicoid 41 and an engagement pin (radial projection) 42 which extends in the radial and outward direction. The male helicoid 41 engages with the female helicoid 32 formed on the inner peripheral surface of the linear movement ring 30. A cylindrical roller 70 is fitted on the engagement pin 42. The engagement pin 42 and the roller 70 are slidably engaged in the engagement groove 22 of the male helicoid ring 20 via the helical through groove 33. Consequently, the cam ring 40 is restricted so as to rotate together with the male helicoid ring 20. The male helicoid ring 20, the engagement groove 22, the linear movement ring 30, the through groove 33, the cam ring 40, the engagement pin 42 and the roller 70 constitute a guiding mechanism.

The cam ring 40 is provided on its inner peripheral surface with an inner helical light interception projection 45 and a cam groove 44. The cam groove 44 which is formed in a space between the ridges of the helical light interception projection 45 does not extend through the cam ring 40 and does not intersect the helical light interception projection 45. The cam ring 40 is provided on its rear end with an inner flange 46 which protrudes radially and inwardly.

The roller 70 fitted on the engagement pin 42 is formed as a cylinder as shown in FIG. 3. The roller 70 is provided on its outer peripheral surface at the opposed ends with a small diameter portion (engagement portion) 72 whose diameter is d1, and on its outer peripheral surface at an intermediate portion, with an annular projection (slip-off prevention portion) 71 whose diameter d2 is greater than the diameter d1 (d1<d2). The outer diameter of the annular projection 71 is such that the annular projection 71 can pass in the helical through groove 33 at the large width portion (roller mounting portion) 36 formed at the angle position θ as shown in FIG. 4, but cannot pass through the helical through groove 33 at the remaining portions other than the roller mounting portion 36 in which d2>d1 (other than angular position θ in FIG. 4).

A movable lens barrel 50 is arranged in the cam ring 40. The movable lens barrel 50 is provided, on its outer peripheral surface of the rear end thereof, with an outer helical light interception projection 51 corresponding to the inner helical light interception projection 45. The outer and inner helical light interception projections 51 and 45 do not screw-engage with each other and do not apply any force to each other even if they are brought into contact with each other, so that no light can pass in a space defined between the barrel elements without preventing relative rotation and relative movement in the optical axis direction between the cam ring 40 and the movable lens barrel 50. Moreover, a shaft hole 52 is formed on an extension of the outer helical light interception projection 51, so that a guide shaft 80 extending in the radial direction is secured in the shaft hole 52. The guide shaft 80 supports a first lens group holder 100 via a guide pin 82 on the inner diameter side and is provided with a cam pin 81 on the outer diameter side. The cam pin 81 is slidably engaged in the cam groove 44.

A linear movement guide ring 60 is provided in the movable lens barrel 50 so as to move together with the cam ring 40 in the optical axis direction. The linear movement guide ring 60 is provided on its rear end with a flange 61. Provided on the flange 61 is a flange projection 61a which protrudes in the radial and outward direction and is slidably fitted in the linear movement guide groove 34 of the linear movement ring 30. Consequently, the linear movement guide ring 60 is movable in the optical axis direction but is not rotatable relative to the linear movement ring 30. The linear movement guide ring 60 is further provided with an annular projection 62 in front of the flange, so that the inner flange 46 is held between the flange 61 and the annular projection 62, and hence the cam ring 40 is rotatable relative to and is axially movable together with the linear movement guide ring 60. A linear movement guide slot 63 extending in parallel with the optical axis O is provided in front of the annular projection 62, and a first lens group holder 100 is slidably fitted in the linear movement guide slot 63. The guide pin 82 of the guide shaft 80 is secured to the first lens group holder 100. The first lens group L1 is located within the linear movement guide ring 60 and is supported by the first lens group holder 100. The first lens group holder 100 is reciprocally moved in the optical axis direction in accordance with the reciprocal rotation of the cam ring 40, since the cam pin 81 of the guide shaft 80 is fitted in the cam groove 44 having a predetermined profile, formed in the cam ring 40.

In the zoom lens barrel 110 as constructed above, when the male helicoid ring 20 is rotated in the forward or reverse direction relative to the stationary ring 10, the male helicoid ring 20 is moved in the optical axis direction in accordance with the lead of the female helicoid 11 and the male helicoid 21 while rotating. In accordance with the movement of the male helicoid ring 20, the linear movement ring 30 which is mounted to the male helicoid ring 20 so as to rotate relative to the male helicoid ring 20 but so as not to rotate relative to the stationary ring 10 is moved in the optical axis direction without rotating. Also, the rotation of the male helicoid ring 20 causes the roller 70 (engagement pin 42) which engages with the engagement groove 22 to rotate about the optical axis, and hence the cam ring 40 is moved in the optical axis direction while rotating in accordance with the lead of the female helicoid 32 and the male helicoid 41. In accordance with the movement of the cam ring 40, the linear movement guide ring 60 which is attached to the cam ring 40 so as to rotate relative thereto but to move together therewith in the optical axis direction is moved in the optical axis direction without rotating. Since the movement of the linear movement guide ring 60 and the rotation of the cam ring 40 cause the cam pin 81 of the guide shaft 80 to move linearly in the optical axis direction in accordance with the profile of the cam groove 44, the first lens group holder 100, which is guided by the linear movement guide slot 63 and secured to the guide shaft 80, is moved in the optical axis direction. Thus, the first and second lens groups L1 and L2 are moved while changing the distance therebetween to vary the focal length.

Figure 2:
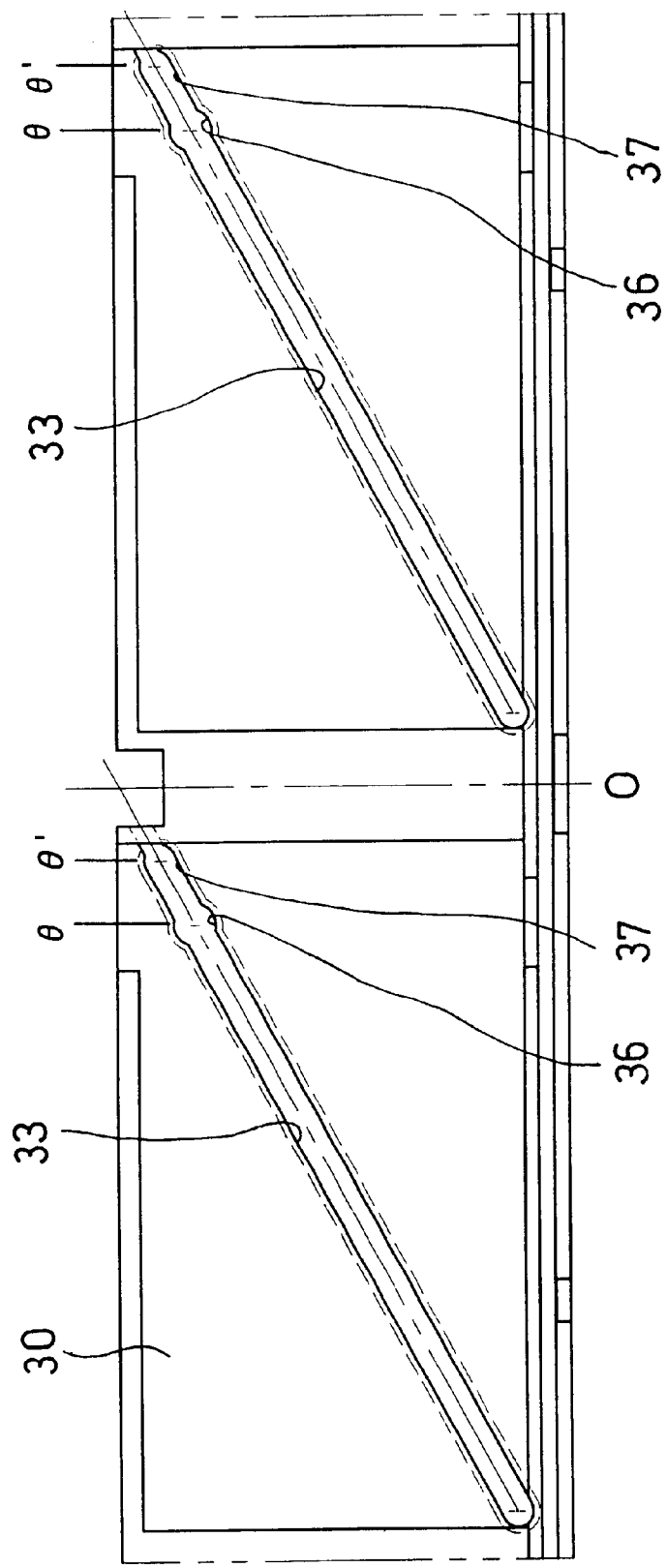
FIG. 2 is a developed view of a helical through groove of a linear movement ring according to the present invention.

The zoom lens barrel 110 is assembled as follows. Since the front end of the engagement pin 42 is coincides with the outer diameter of the linear movement ring 30, the cam ring 40 provided with the engagement pin 42 is deflected and inserted in the linear movement ring 30, so that the engagement pin 42 is fitted in the helical through groove 33. Thereafter, the cam ring 40 inserted in the linear movement ring 30 is rotated until the engagement pin 42 is moved to the angle position θ shown in FIG. 2. Since the roller mounting portion 36 of the helical through groove 33 is formed at the angle position θ and the width of the roller mounting portion 36 is such that the annular projection 71 which corresponds to the largest diameter portion of the roller 70 can pass therethrough, the roller 70 can be fitted onto the engagement pin 42 from the outside of the linear movement ring 30. After the roller 70 is fitted on the engagement pin 42 at the roller mounting portion 36, the cam ring 40 and the linear movement ring 30 are relatively rotated, in accordance with the profile of the helical through groove 33 to move the engagement pin 42 (roller 70) to the male helicoid ring mounting portion 37 at an angle position θ' shown in FIG. 2. In this position, the male helicoid ring 20 is mounted, so that the roller 70 is fitted in the engagement groove 22.

Since the roller 70 is made of the cylindrical body 72 whose diameter is d1 and the annular projection 71 whose diameter d2 is greater than d1 (d1<d2), as shown in FIG. 3, there is no chance of the roller slipping off from the helical through groove 33 whose width t2 on the outer diameter side is smaller than the diameter d2 (t2<d2). This dimensional relationship is true except for the roller mounting portion 36 (angle position θ) shown in FIG. 4. Namely, if the roller 70 is attached to a portion other than the roller mounting portion 36, e.g., the male helicoid ring mounting portion 37 (angle position θ'), no detachment of the roller 70 from the engagement pin 42 takes place, and hence it is possible to move the assembly in the course of the manufacturing operation and to facilitate the attachment of the male helicoid ring 20. Furthermore, once the male helicoid ring 20 is mounted and the roller 70 is fitted in the engagement groove 22, the movement of the roller 70 is restricted by the engagement groove 22, and accordingly no disengagement of the roller occurs. Namely, no accidental detachment of the roller 70 from the engagement pin 42 occurs not only during the transportation or movement in the manufacturing operation of the zoom lens barrel 110 but also during the assembling operation of other elements.

Figure 5:
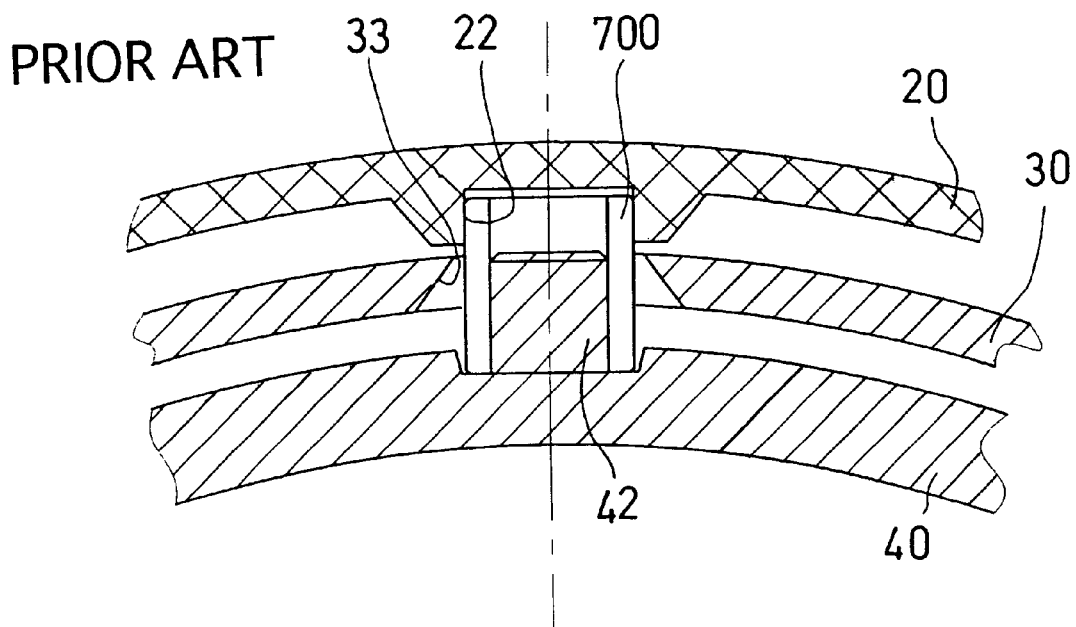
FIG. 5 is an enlarged sectional view of a known zoom lens barrel.
Figure 6:
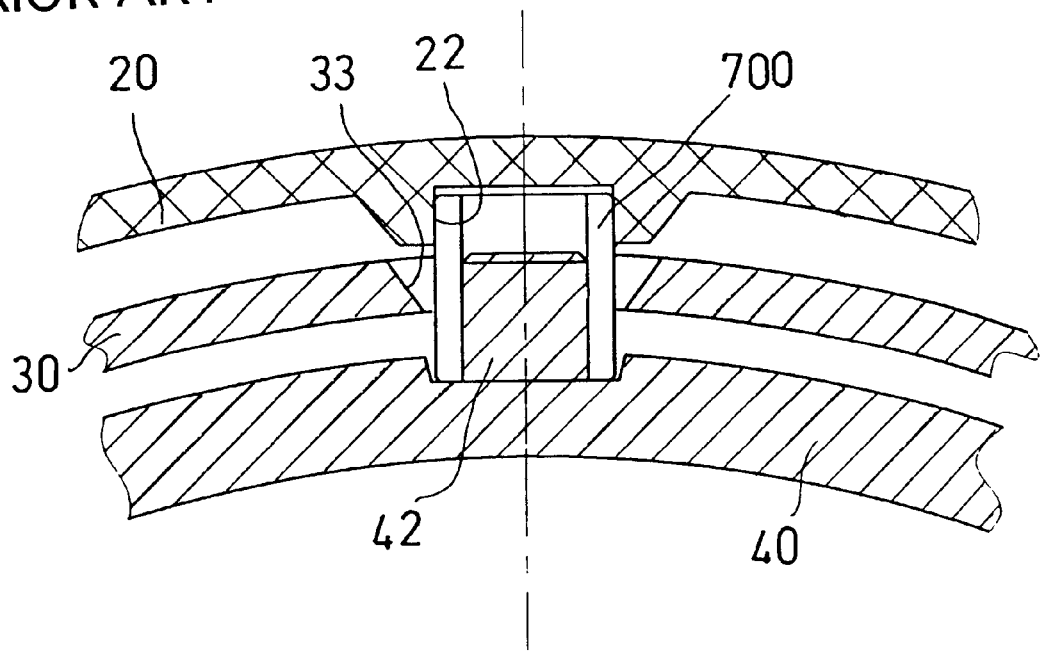
FIG. 6 is an enlarged sectional view of a known zoom lens barrel.

FIGS. 5 and 6 are sectional views of main parts of a known zoom lens barrel, shown as a comparison with the zoom lens barrel of the present invention. In this comparative example, the elements corresponding to those in the present invention are designated with like reference numerals. In the linear movement ring 30 which is, in general, made of plastic mold or the like, the helical through groove 33 is formed in a non-rectangular shape (trapezoidal section) having an oblique side to provide a draft. If the roller 700 having a uniform diameter is used for the helical through groove 33, unless the roller 700 is engaged with the engagement groove 22 of the male helicoid ring 20, there is a possibility of the roller 700 detaching from the engagement pin 42 and disengaging from the helical through groove 33.

In the illustrated embodiment of the invention, the through groove 33, whose width t1 on the inner diameter side is greater than the width t2 thereof on the outer diameter side to prevent the roller 70 from slipping-off, is in the form of a helical groove extending in parallel with the helicoid. Alternatively, it is possible to form the linear movement guide groove 63 or the cam groove 44 in a tapered shape (non-rectangular shape) so as to engage with a roller having the slip-off prevention portion, similar to that of the roller 70. The shape of the roller 70 is not limited to that in the illustrated embodiment and can be, for example, a stepped shape or a non-rectangular (tapered sectional) shape corresponding to the non-rectangular groove, provided that the roller 70 is provided with the slip-off prevention portion whose width is greater than the minimum width of the groove in which the roller is to be engaged, to prevent the roller from being disengaged from the groove.

In the above description, only one roller 70 and only one of each related member thereof is described for clarity reasons. However in practice, at least two rollers 70 and at least two of each related member thereof are provided in order to achieve reliable and steady movement of the zoom lens barrel 110 upon zooming.

As can be understood from the above discussion, in a zoom lens barrel according to the present invention, the groove whose width on the inner diameter side is greater than the width thereof on the outer diameter side is engaged by the roller having the slip-off prevention portion whose diameter is greater than the opening width of the groove on the outer diameter side but smaller than the opening width on the inner diameter side. Consequently, there is no chance of the roller being accidentally detached during the assembling operation, or when the zoom lens barrel is used. As a result, the assembling operation can be simplified and no detachment of the elements occurs. Thus, an improved and high-quality zoom lens barrel which can be easily assembled can be obtained.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens barrel comprising:
   a through groove which is provided on a first cylindrical member;
   a radial projection provided on a second cylindrical member which is disposed in the first cylindrical member; and
   a roller which is supported by the radial projection and is fitted in the through groove; wherein
   said through groove formed on the first cylindrical member has an opening width on the inner diameter side of the first cylindrical member which is greater than the opening width on the outer diameter side thereof;
   said roller is provided with an slip-off prevention portion whose diameter is greater than said opening width of the through groove on said outer diameter side, but smaller than said opening width on said inner diameter side; and
   said through groove is provided with a large width portion at which the roller is fitted in the through groove from the outside of the first cylindrical member, so that the slip-off prevention portion is located in the through groove.

2. A zoom lens barrel according to claim 1, wherein
   said through groove is in the form of a non-rectangular sectional shape having a tapered side, wherein the width is gradually increased from said outer diameter side of said first cylindrical member toward said inner diameter side thereof; and
   said slip-off prevention portion is in the form of a non-rectangular sectional shape having a tapered side, wherein the diameter of said slip-off prevention portion is gradually increased from said outer diameter side of said first cylindrical member toward said inner diameter side thereof, wherein said non-rectangular sectional shape corresponds to the sectional shape of the through groove.

3. A zoom lens barrel according to claim 1, further comprising a third cylindrical member provided outside said first and second cylindrical members, said third cylindrical member being provided with a bottomed groove on the inner peripheral surface thereof whose profile is different from the profile of said through groove of the first cylindrical member; wherein
   said roller is provided with an engagement portion which has a diameter smaller than the width of the through groove on said outer diameter side of said first cylindrical member and which projects from the through groove and through said outer diameter side to engage with said bottomed groove.

4. A zoom lens barrel according to claim 3, wherein
   said first cylindrical member is a linear movement cylinder which is guided to move in the optical axis direction;
   said third cylindrical member is a rotary cylinder which is connected to said linear movement cylinder so as to rotate relative thereto but not to relatively move in the optical axis direction;
   said bottomed groove of the third cylindrical member extends in parallel with the optical axis and said through groove is inclined with respect to the optical axis; and
   said second cylindrical member is a rotary feed cylinder which is moved in the optical axis direction while rotating in accordance with the profile of the through groove via the rotation of said rotary cylinder.

5. A zoom lens barrel according to claim 1, wherein, upon assembling the roller into the bottomed groove of the third cylindrical member, the roller which is inserted in the through groove of the first cylindrical member through the large width portion is moved to a portion other than the large width portion, so that the roller is engaged in the bottomed groove of the third cylindrical member.

6. A guiding mechanism for cylindrical members comprising:

a first cylindrical member and a second cylindrical member which is disposed in the first cylindrical member;

a through groove formed on the first cylindrical member, said through groove having an opening width on the inner diameter side of the first cylindrical member which is greater than the opening width on the outer diameter side thereof; and a roller which is fitted in said through groove and is supported on a radial projection provided on the second cylindrical member, said roller being provided with a slip-off prevention portion whose diameter is greater than the opening width of the through groove on the outer diameter side of said first cylindrical member and smaller than the opening width on the inner diameter side thereof.

7. The guiding mechanism according to claim 6, wherein said through groove is provided with a partial large width portion at which the roller is fitted in the through groove from the outside of the first cylindrical member so that the slip-off prevention portion is located in the through groove.

8. The guiding mechanism according to claim 6, wherein said through groove is in the form of a non-rectangular sectional shape having a tapered side, wherein the width is gradually increased from said outer diameter side of said first cylindrical member toward said inner diameter side thereof; and said slip-off prevention portion is in the form of a non-rectangular sectional shape having a tapered side, wherein the diameter of said slip-off prevention portion is gradually increased from said outer diameter side of said first cylindrical member toward said inner diameter side thereof, wherein said non-rectangular sectional shape corresponds to the sectional shape of the through groove.

9. The guiding mechanism according to claim 6, further comprising a third cylindrical member provided outside said first and second cylindrical members, said third cylindrical member being provided with a bottomed groove on the inner peripheral surface thereof whose profile is different from the profile of said through groove of the first cylindrical member; wherein said roller is provided with an engagement portion which has a diameter smaller than the width of the through groove on said outer diameter side of said first cylindrical member and which projects from the through groove and through said outer diameter side to engage with said bottomed groove.

10. The guiding mechanism according to claim 9, wherein said first cylindrical member is a linear movement cylinder which is guided to move in the optical axis direction;

said third cylindrical member is a rotary cylinder which is connected to the linear movement cylinder so as to rotate relative thereto but not to relatively move in the optical axis direction;

said bottomed groove of the third cylindrical member extends in parallel with the optical axis and said through groove is inclined with respect to the optical axis; and said second cylindrical member is a rotary feed cylinder which is moved in the optical axis direction while rotating in accordance with the profile of the through groove via the rotation of said rotary cylinder.

11. The guiding mechanism according to claim 6, wherein, upon assembling the roller into the bottomed groove of the third cylindrical member, the roller which is inserted in the through groove of the first cylindrical member through the large width portion is moved to a portion other than the large width portion, so that the roller is engaged in the bottomed groove of the third cylindrical member.

* * * * *